US012033465B1

(12) United States Patent
Pascal et al.

(10) Patent No.: US 12,033,465 B1
(45) **Date of Patent: *Jul. 9, 2024**

(54) METHOD, SYSTEM, AND APPARATUS FOR ENABLING PLAYERS TO EARN TANGIBLE REWARDS ON A SOCIAL GAME

(71) Applicant: Playstudios US, LLC, Las Vegas, NV (US)

(72) Inventors: Andrew Pascal, Las Vegas, NV (US); Paul Mathews, Las Vegas, NV (US); Monty Kerr, Las Vegas, NV (US)

(73) Assignee: Playstudios US, LLC, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/695,804

(22) Filed: Mar. 15, 2022

Related U.S. Application Data

(63) Continuation of application No. 14/144,581, filed on Dec. 31, 2013, now Pat. No. 11,282,336, which is a continuation-in-part of application No. 13/472,454, filed on May 15, 2012, now abandoned.

(60) Provisional application No. 61/747,822, filed on Dec. 31, 2012, provisional application No. 61/598,767, filed on Feb. 14, 2012, provisional application No. 61/486,527, filed on May 16, 2011.

(51) Int. Cl.
*G06F 17/00* (2019.01)
*G07F 17/32* (2006.01)

(52) U.S. Cl.
CPC ................................ *G07F 17/3244* (2013.01)

(58) Field of Classification Search
CPC .. G07F 17/32; G07F 17/3239; G07F 17/3244; G07F 17/3255
USPC ...................................................... 463/16–42
See application file for complete search history.

(56) References Cited

U.S. PATENT DOCUMENTS

2008/0026822 A1* 1/2008 Walker .................... G07F 17/32 463/25

* cited by examiner

*Primary Examiner* — Masud Ahmed
(74) *Attorney, Agent, or Firm* — Muskin and Farmer LLC

(57) ABSTRACT

A method, apparatus, and computer readable storage to implement an online casual casino games which provide a player an opportunity to earn loyalty points which are independent of outcomes of the casino games themselves. Loyalty points can be earned by advancing levels or wagering a certain amount in chips (typically with a non-cash value). Once enough loyalty points are earned, they can be redeemed for tangible goods and services.

4 Claims, 13 Drawing Sheets

FIGURE 10
LEVEL 3
5000/10000
$1418
4351 points
SELECT YOUR REWARD:
FREE DRINK HOTEL A 2000 POINTS
FREE DRINK HOTEL B 2100 POINTS
ONE NIGHT STAY IN HOTEL A 50000 POINTS
1000
1001
BREAKFAST AT MOE'S TAVERN 32500 POINTS
SOUFFLE AT JACK'S BISTRO 32500 POINTS
SOLD OUT
ADMISSION TO BOB'S CLUB HOTEL C 18500 POINTS

METHOD, SYSTEM, AND APPARATUS FOR ENABLING PLAYERS TO EARN TANGIBLE REWARDS ON A SOCIAL GAME

CROSS REFERENCE TO RELATED APPLICATIONS

This Application is a continuation in part of application Ser. No. 13/472,454 (which is incorporated by reference herein in its entirety), filed on May 15, 2012, which A) claims benefit of U.S. provisional application 61/486,527, filed on May 16, 2011, entitled, "System and Method for Redeeming Virtual Currency/Points for Tangible Goods and/or Services" which is incorporated by reference herein in its entirety; and B) also claims benefit to U.S. provisional application 61/598,767, filed on Feb. 14, 2012, entitled, "Social Networking Game with Non-Random Prizes" which is incorporated by reference herein in its entirety. This Application also claims benefit to U.S. provisional application 61/747,822, filed on Dec. 31, 2012, which is incorporated by reference herein in its entirety.

BACKGROUND OF THE INVENTION

Field of the Invention

The present general inventive concept is directed to a method, apparatus, and computer readable storage medium directed to a game that can be played on social networking sites wherein a player can earn tangible prizes without being required to deposit real money.

Description of the Related Art

Virtual casinos allow players to play casino games for real money or for fun (using worthless credits). Gambling online is currently not legal in the U.S. and even if it were, gambling for real money subjects players to losing money.

What is needed is a way in which players can gamble online without risking real money, yet still being able to earn tangible goods and services.

SUMMARY OF THE INVENTION

It is an aspect of the present invention to provide a system and method that allows players to earn tangible goods and services while playing an online game without having to gamble for real money.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

Further features and advantages of the present invention, as well as the structure and operation of various embodiments of the present invention, will become apparent and more readily appreciated from the following description of the preferred embodiments, taken in conjunction with the accompanying drawings of which.

DESCRIPTION OF THE PREFERRED EMBODIMENTS

Figure 1:
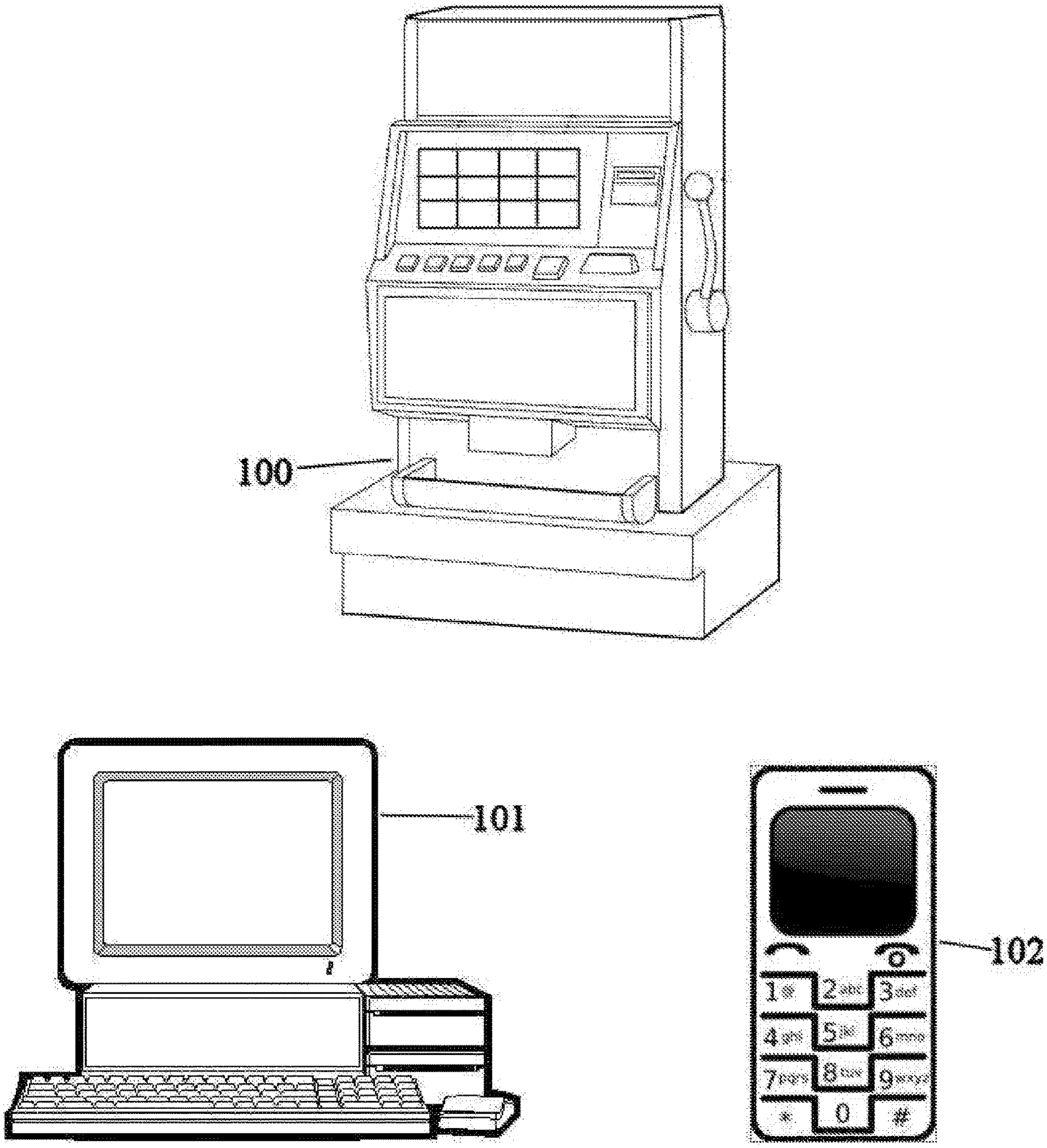
FIG. 1 is a drawing illustrating numerous apparatuses that can play the game described herein, according to an embodiment.

Reference will now be made in detail to the presently preferred embodiments of the invention, examples of which are illustrated in the accompanying drawings, wherein like reference numerals refer to like elements throughout.

The present inventive concept relates to a game that can be played on a social networking site such as FACEBOOK (including what is described in U.S. Pat. No. 7,669,123 which is incorporated by reference herein in its entirety), MYSPACE, or any other site which maintains a database of users and provides an interface for interaction. The game can provide a player with an opportunity to play a game such as slot machine type games, casino games, and other types of games.

There are two types of point values that each player on a gaming site (which can exist as an independent site or an application played on a social networking platform such as FACEBOOK or other delivery mechanism) can possess: credits and loyalty points.

Credits (also referred to as non-cash value credits, non-cash value chips, NCV credits, NCV chips) are used to play each instance of a wagering game but cannot be directly exchanged for cash. For example, a slot game may require a payment of 100 credits in order to spin the slot machine, and if the player wins then the player is awarded in credits. A player can place a "wager" of 50 credits (or $50 in non-cash value chips) on a hand in a virtual blackjack game wherein depending on the outcome, the player would lose the wager or win an award in a same form of the initial "wager" (e.g., the player would win 50 credits or win 50 non-cash value chips). The word "wager" is embedded in quotes because these are not wagers for real money, in that if the player wins, he wins more credits but the credits are not exchangeable for cash (this could run afoul of online gambling laws). Players may be given credits for free (e.g., each player gets 10 free credits each day or week), or players may be given the opportunity to purchase credits for real money (cash). Credits can be purchased using a payment processor which can accept payment via a credit card, PAYPAL account, etc.

Loyalty points (also referred to as loyalty currency) are points that players can earn by their activity on and related to the site. In general, loyalty points are a measure of the value of a player to the site (the more points a player has means the player is more valuable to the site). Examples of ways loyalty points can be earned by a player include: 1) Referring friends to the site (the player can identify a friend to the site (either their email address or clicking their name) and if this friend signs up with the site, this can be considered a referral). Or, a referral can be considered an initial referral from a player to his friend(s) regardless of whether those friends actually sign up with the site. A player can receive a predetermined amount of points per referral (e.g., 20 loyalty points per referral), or a player can receive a predetermined amount of loyalty points per a number of referrals (e.g., when a player refers 10 friends the player gets 100 loyalty points). 2) As an add-on to earning loyalty points based on a number of friends referred, loyalty points can also be determined based on the "quality" (or "value") of those friends. For example, if player's referred friends have a good average "quality" (they play on the site a lot, refer others, spend cash on the site, etc.) then the player would earn more loyalty points because the quality/value of this player's referrals are good. This can be quantified by taking an average of loyalty points of a player's friends and awarding the player this average in additional loyalty points (the average can optionally be multiplied by a constant or other variable). In other words, the quality of a player's referrals can be measured by each of their respective number of loyalty points, and this quality can be used in order to help the player earn additional loyalty points. Of course the better quality of a player's referrals the more additional loyalty points the player will earn, while a worse qualify of a player's referrals the less additional loyalty points the player will earn. The quality (also referred to as value in this context) of a player's referrals can be measured using other mechanisms besides loyalty points, for example, summing the number of referrals of each of the player's referrals; summing a total of cash purchases of the player's referrals, or quantifying any other factor described herein that would measure the quality/value of a player's referrals. For example, Joe referred ten friends who on the average referred two friends each (for a total of 20 new referrals), and Bob referred 3 friends who on the average referred 10 friends each (for a total of 30 new referrals), Bob (if the metric were simply the number of referrals of referrals) would be more valuable to the site than Joe (and in an embodiment Bob would be awarded more loyalty points (e.g., 30 points) than Joe (20 points) if loyalty points were solely measured on referrals of referrals). In a further embodiment, loyalty points can be based on (or incorporate) a player's total derivative referrals (e.g., referrals, referrals of those referrals, and so on). "Derivate referrals" refers to every player who is referred to the site that would not be registered users of the site (assuming they would not have found the site independently) but for the player's entire network of referrals (e.g., Bob's derivative referrals are all of Bob's referrals plus all of Bob's referral's referrals plus all of Bob's referral's referral's referrals, and so on).

In an embodiment, loyalty points can be awarded to the player based on an accumulation of wagers the player places using credits (also referred to as chips). The player's wager amounts (the amount of credits the player wagers) is accumulated and once it reaches (e.g., equals or exceeds) a point threshold, then the player is awarded an amount of loyalty points and the accumulated wager totals are reset to zero so the player can begin again to accumulate points. For example, in one configuration, the player can be awarded 5 loyalty points every 10 credits the player wagers. When the player starts playing, the accumulated wager total can be reset to zero, and if the player wagers one credit each game (e.g., spin on a slot machine game), then after 10 spins the accumulated wager total would reach the point threshold and the player would earn the 5 loyalty points and the accumulated wager total would be reset to 0. In this manner, the player is encouraged to continue to play the game to earn loyalty points. Typically, the game requires a wager of credits so the player would be spending credits in exchange for loyalty points (although of course if the player wins during the slot machine game then the player can show a profit of credits).

Figure 2:
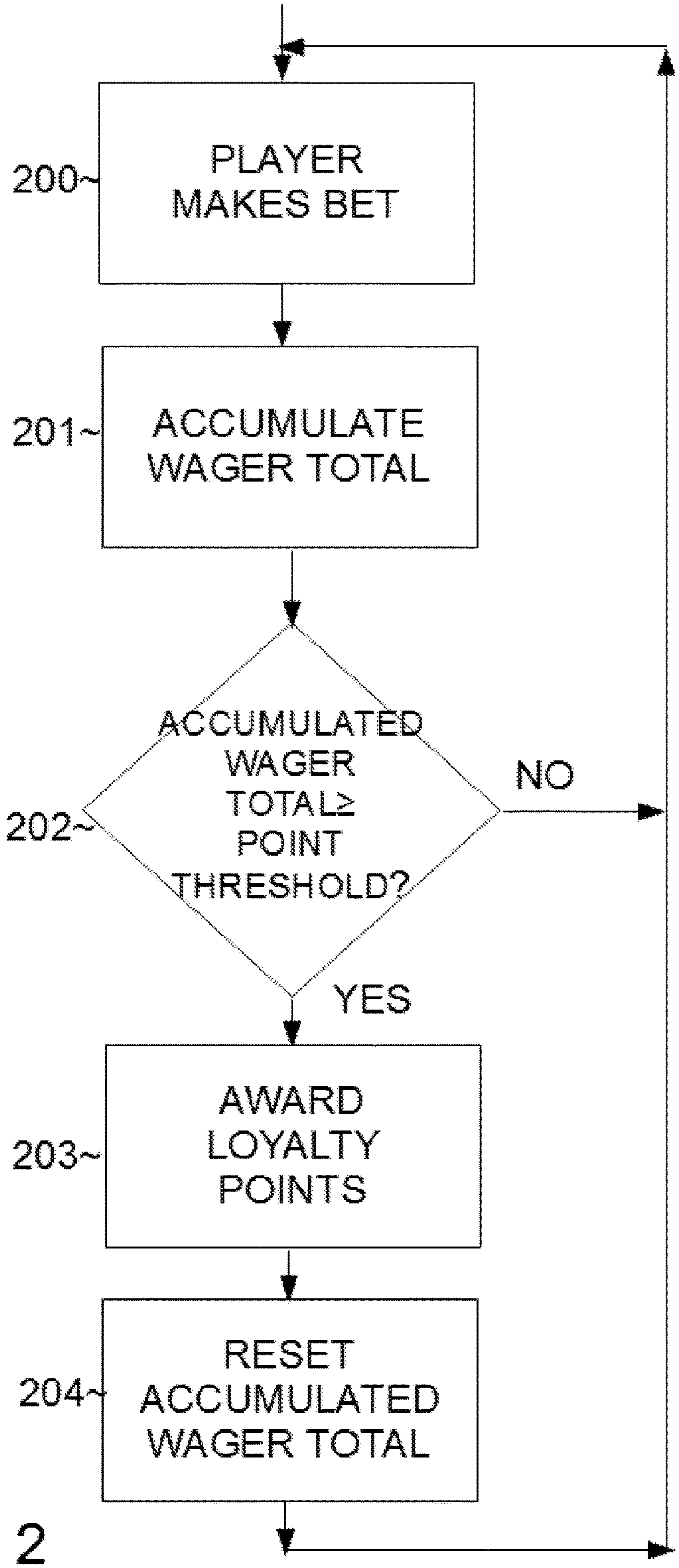
FIG. 2 is flowchart illustrating an exemplary method of awarding loyalty points based on an accumulation of wagers, according to an embodiment.

FIG. 2 is flowchart illustrating an exemplary method of awarding loyalty points based on an accumulation of wagers, according to an embodiment. When the method starts, the accumulated wager total is set to zero.

The method can begin with operation 200, wherein the player makes a bet (also referred to as wager). The player can select their wager amount (the number of credits the player wishes to bet on each spin (or other game)). The player then initiates a game (e.g., by pressing a "spin" button, etc.) The game is completed and an outcome is determined by the computer implemented the game. The outcome can be a loss (no award) or can be a win (a non-zero award of credits to the player). Any credits won are added to the player's credit meter. For example, a slot machine game displays random symbols, and certain predetermined combinations of the symbols result in an award. If the outcome does not display any winning predetermined combination of symbols then the result is no award (a win of zero) which is a loss since the player paid the wager amount (which was deducted from the player's credit meter).

From operation 200, the method proceeds to operation 201, which accumulates the wager amount in operation 201 as the accumulated wager total.

From operation 201, the method proceeds to operation 202, which determines whether the accumulated wager total is greater than equal to the point threshold. If not, then the player does not earn any loyalty points and the method can return to operation 600 wherein the player can continue to make bets.

If in operation 202, it is determined that the accumulated wager total is greater than equal to the point threshold, then the method proceeds to operation 203, which awards the player an amount of loyalty points. Typically, the amount of loyalty points is predetermined (although it may not be such as a random amount).

Note that the point threshold can vary by level. For example, the higher the level, the higher the point threshold meaning the more action a player must wager in order to proceed to operation 203 and receive more free loyalty points. For example, a table can be used such as Table 0 below. Thus, as the player's advances in level in the game, the point threshold would increase requiring more action (wager amounts) by the player to receive the loyalty points in operation 203. In another embodiment, the point threshold would not vary as in Table 0 but would always be static.

TABLE 0

| Level | point threshold |
|---|---|
| 1 | 10 |
| 2 | 10 |
| 3 | 12 |
| 4 | 15 |
| 5 | 20 |
| 6 | 50 |
| 7 | 100 |

From operation 203, the method proceeds to operation 204, which resets the accumulated wager total to zero so that the player must wager another point threshold amount of credits to earn the amount of loyalty points again. From operation 204, the method proceeds to operation 200, wherein the player continues to play the game (as long as the player wants to) and can continue to earn loyalty points.

Figure 3:
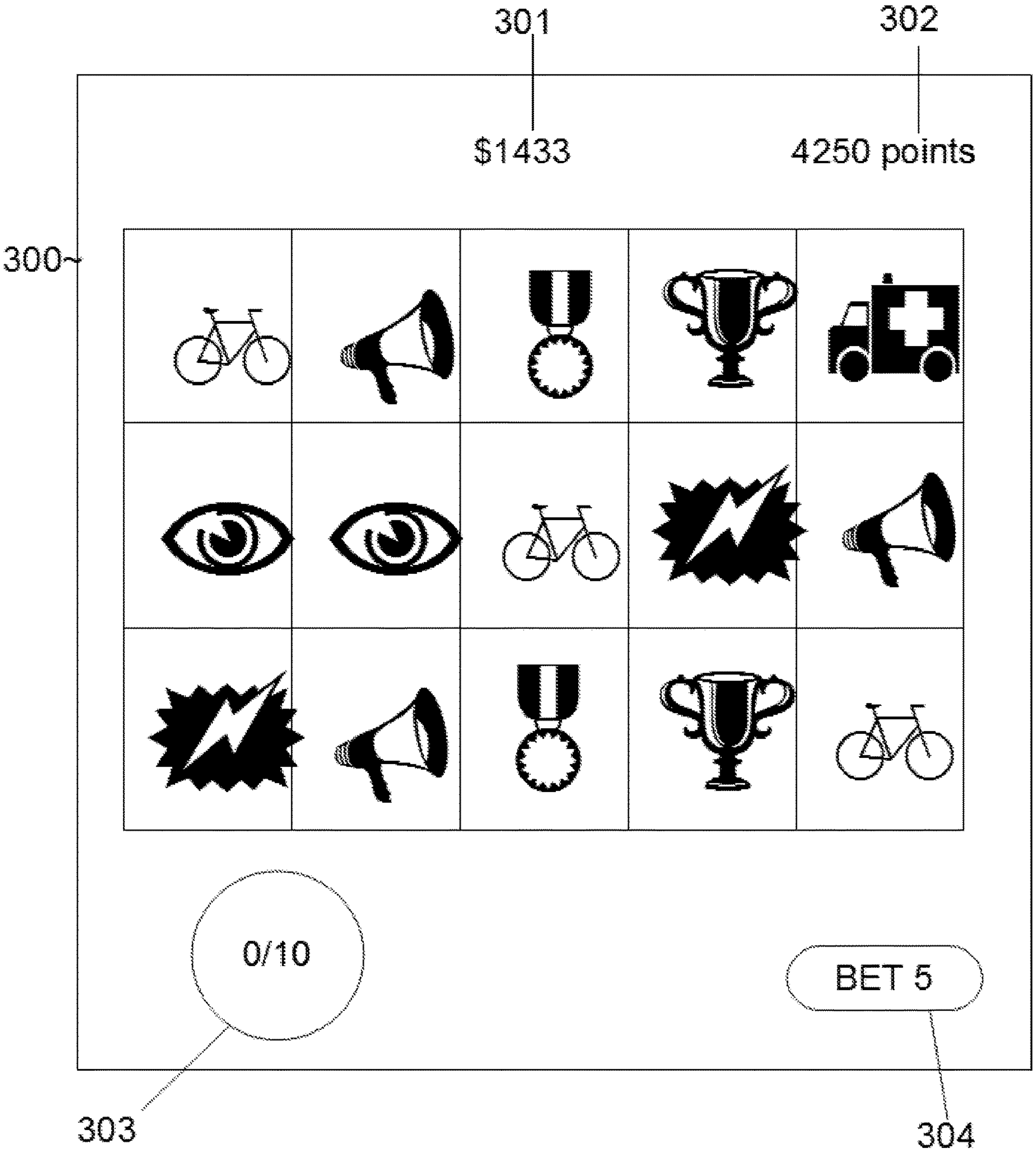
FIG. 3 is a drawing of a game output before a first spin, according to an embodiment.

FIG. 3 is a drawing of a game output before a first spin, according to an embodiment.

A game output screen/window 300 shows a slot game that can be used to play a wagering game and earn loyalty points. In addition to a slot game, other games can be used as well, such as blackjack, bingo, craps, etc. A credit meter 301 shows how many credits (chips) the player currently has. A loyalty point meter 302 shows how many loyalty points the player currently has. An accumulated wager total meter 303 shows the current accumulated wager total as zero and the point threshold is 10. In an embodiment, the point threshold may not be displayed to the player. A spin button 304 allows the player to initiate a game by pressing the spin button 304, which initiates a game and deducts a wager amount (e.g., 5 credits) from the credit meter 301.

Figure 4:
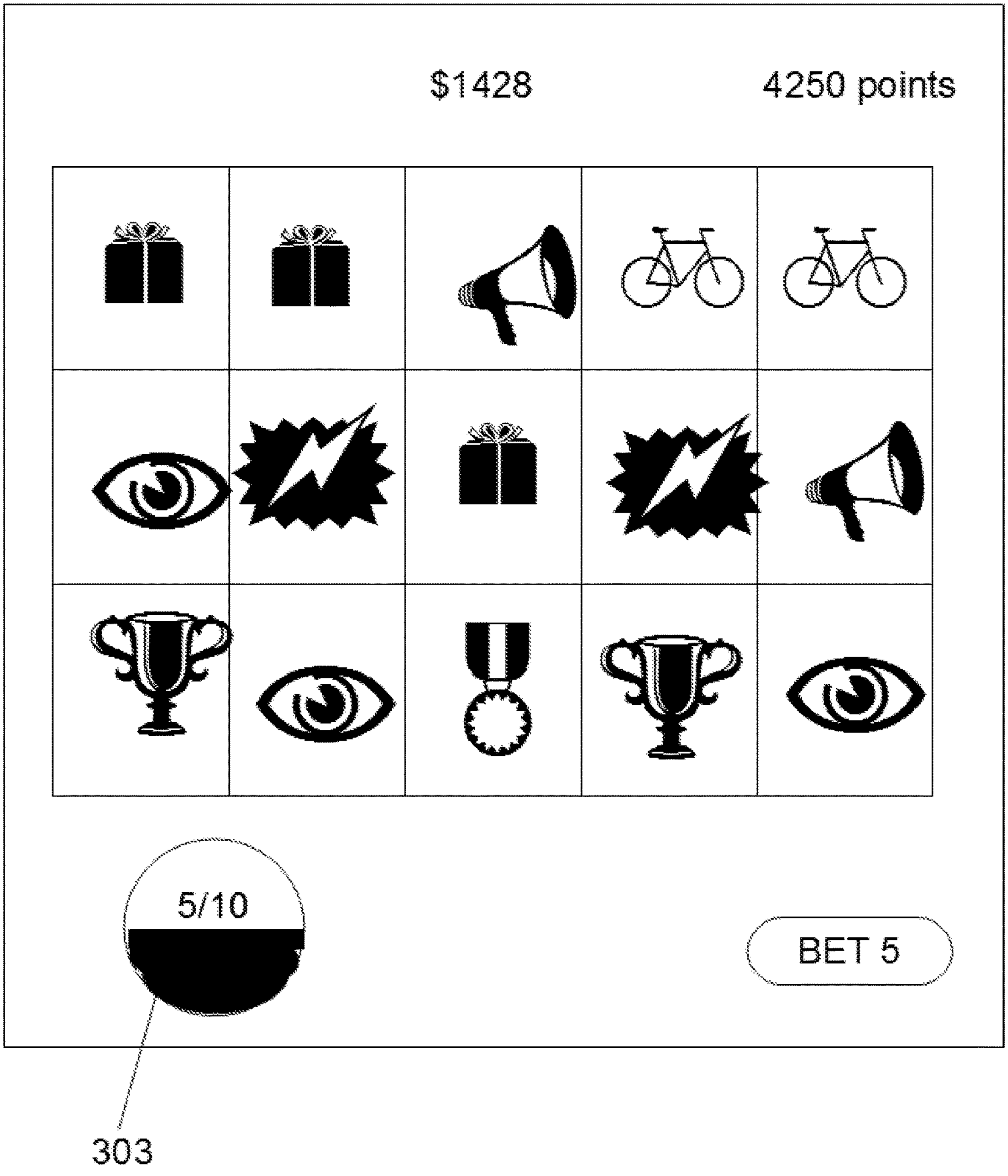
FIG. 4 is a drawing of a game output after a first spin, according to an embodiment.

FIG. 4 is a drawing of a game output after a first spin (after the spin button was pressed in FIG. 3), according to an embodiment.

Note that the An accumulated wager total meter 303 is filled in to reflect the percentage (50%) of the point threshold (10) that has been reached by the accumulated wager total (5). In this way, the player can visualize how far they have to go until they reach the point threshold and earn additional loyalty points. Note that the credit meter has gone down by 5 to reflect the wager of 5 credits (and note the spin did not result in any award, although any award earned by a game is added to the credit meter).

Figure 5:
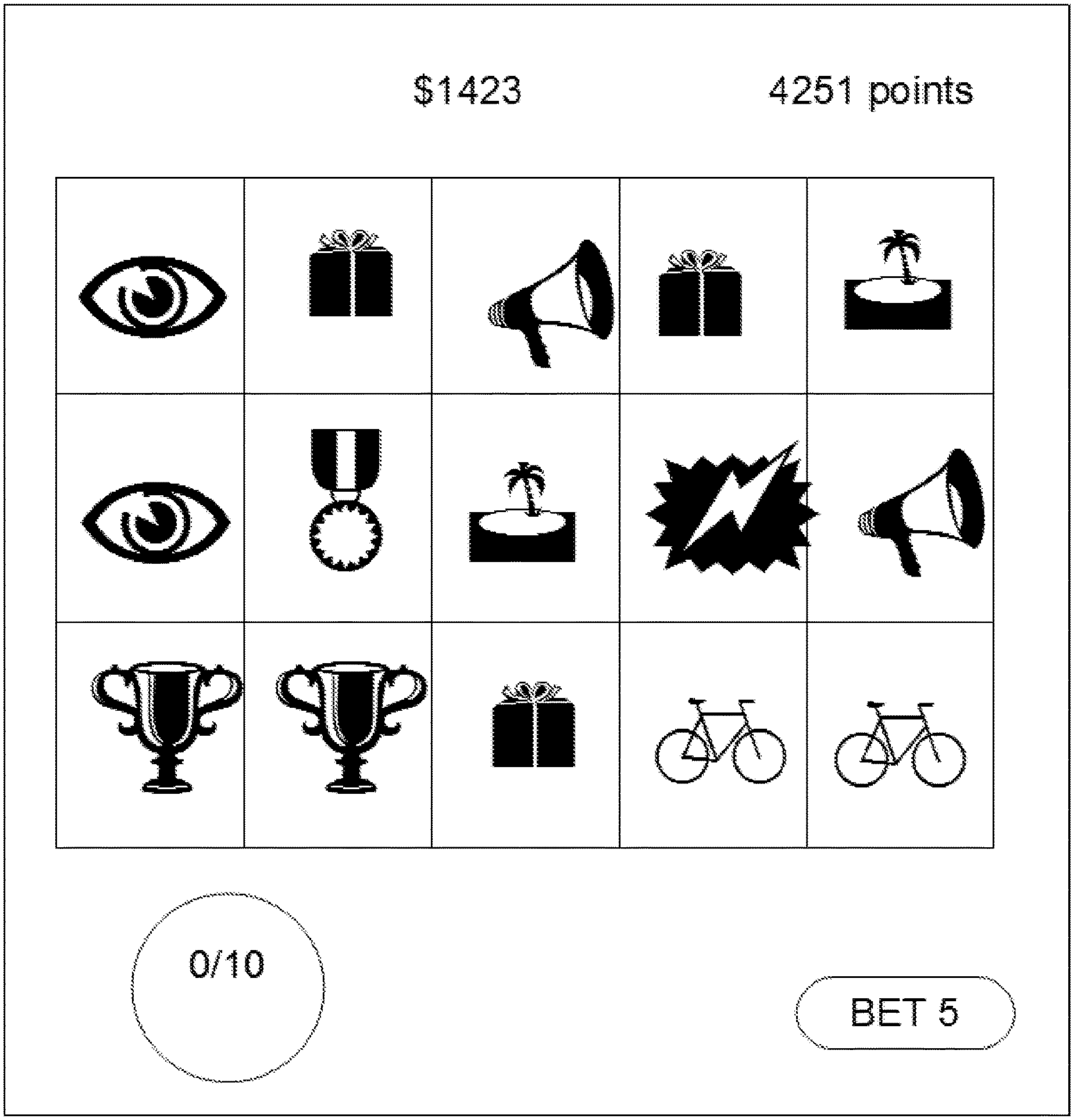
FIG. 5 is a drawing of a game output after a second spin, according to an embodiment.

FIG. 5 is a drawing of a game output after a second spin (after the spin button was pressed in FIG. 4), according to an embodiment.

The player had wagered another 5 credits which caused the accumulated wager total to reach the point threshold (10) which then awards the player an amount of loyalty points (e.g., one point although any other amount of loyalty points can be awarded) and resets the accumulated wager total to zero. The player can continue to play by making wagers of credits which eventually turn into an award of loyalty points. Since the player has the opportunity to purchase credits for real money, over time, the player is indirectly "buying" loyalty points in this manner.

In a further embodiment, loyalty points can be awarded based on a level advancement. A player can advance levels in numerous ways, for example completing a task, collecting a set of items, betting a certain amount of action, etc. Each wager a player makes can be tabulated into a total and the game would track the total amount of wager amount (action) the player has made in total. Unlike the wager total which would reset each time it reaches the point threshold, the total wager action would typically never reset. Thus, the total wager action represents the total amount of wagers the player has made (i.e., the sum of all wager amounts the player ever made in the game for all games offered by the game). In an embodiment, the total wager action can be a function of the game played for each wager placed, for example some games can earn wager action faster than others (for example each game has a coefficient (e.g., from 0.1 (or less) to 100 or more) and each wager placed in that game is multiplied by the game's coefficient and this product is added to the total wager action).

A game can have discrete levels based on the total wager action placed by the player. For example, Table I below represents different discrete levels, respective total wager action level thresholds to reach that level, and respective loyalty points that are awarded to the player when that level is reached. Note that all values in Table I can be set by the game designers according to their preferences and can be somewhat arbitrary.

TABLE I

| Level | total wager action level threshold | loyalty points earned |
|---|---|---|
| 1 | 0 | 0 |
| 2 | 1000 | 100 |
| 3 | 5000 | 2000 |
| 4 | 10000 | 10000 |
| 5 | 20000 | 50000 |

Thus, for example, the player starts at level 1 and remains at level 1 until the player's total wager action reaches 1000, upon which the player advances to level 2 and receives 100 free loyalty points. The player will have a level throughout the entire game which will not reset when the player signs off the game and returns and will not reset when the player plays different games (e.g., the player can switch between slot machine games or blackjack and their level will not be affected by the change). When the player is at level 2, the player will remain at level 2 until the player has 5000 total wager action, upon which the player advances to level 3 and is awarded 2000 free loyalty points. This can continue to any number of levels (e.g., 10 to 100 or more). In this way, the player is encouraged to continue to the play the game (any game offered, such as blackjack, slots, craps, etc.) so that the player can earn more loyalty points.

Figure 6:
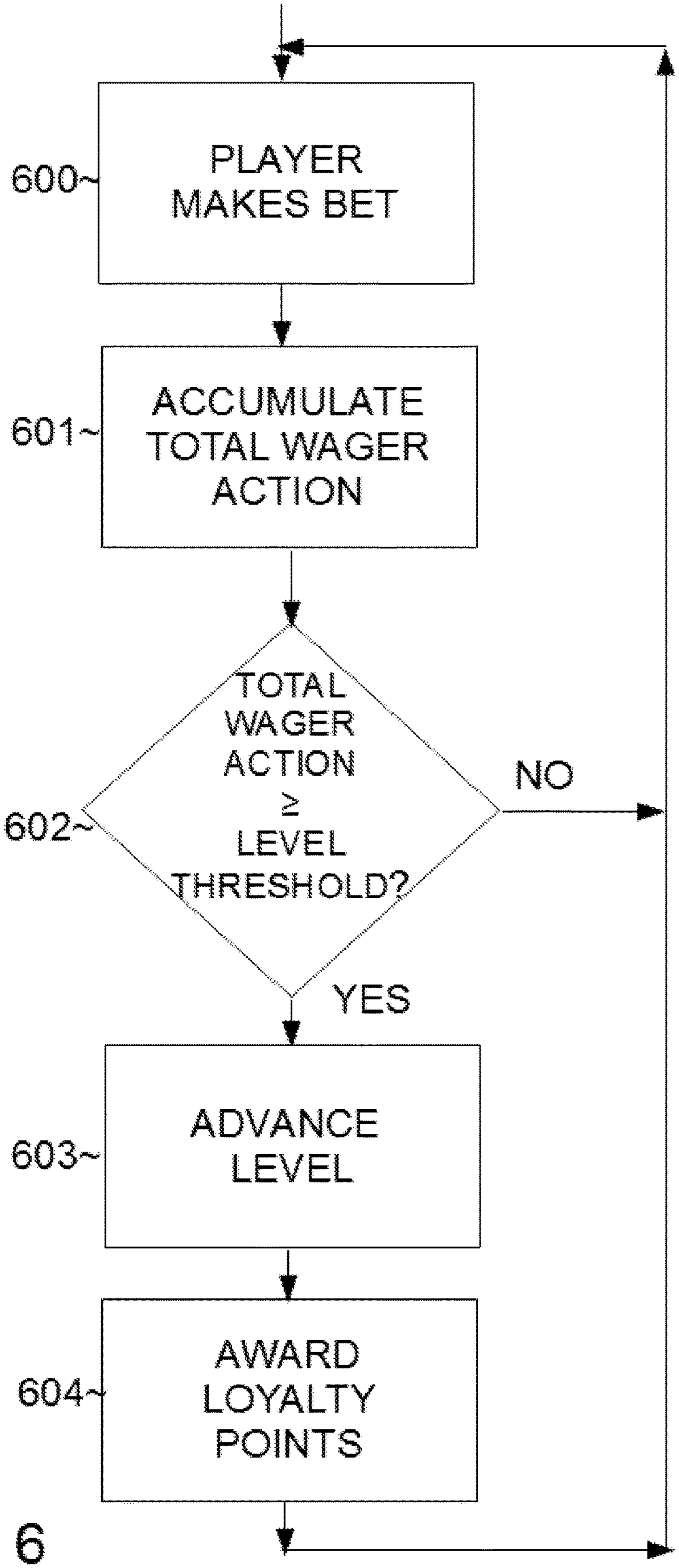
FIG. 6 is a flowchart illustrating an exemplary method of awarding loyalty points based on level advancement, according to an embodiment.

FIG. 6 is a flowchart illustrating an exemplary method of awarding loyalty points based on level advancement, according to an embodiment. Note that when a player first registers with the game and begins playing on the system, the total wager action would be initialized to zero. However, once the player starts playing the total wager action typically would never be reset again to zero.

The method can begin with operation 600, wherein the player makes a bet (wager). This can be done as known in the art and described herein, for example the player indicates a wager amount and presses a "spin" button (or other activation button to initiate a game). The game is completed and an outcome is determined by the computer implemented the game. The outcome can be a loss (no award) or can be a win (a non-zero award of credits to the player). Any credits won are added to the player's credit meter.

From operation 600, the method proceeds to operation 601, which adds the bet amount from operation 600 to the total wager action. In other words, if TWA is a variable representing the total wager action, then operation 601 performs TWA=TWA+bet amount (the bet amount being from operation 600). In one embodiment, the same amount of the bet in operation 600 is the amount added to the total wager action. In another embodiment, the amount of the bet in operation 600 is multiplied by a constant and then the product is added to the total wager action. In this embodiment, TWA=TWA+(bet amount*coefficient). Each game can have a different respective constant which will earn the player more total wager action at different rates. Table II illustrate different games that can be played on the game system and respective coefficients. Note that "the game" and "game system" as used herein encompasses all individual games that are offered by the same server (or group of servers) which are part of the same game system (e.g., all use the same player's account).

TABLE II

| Game | Coefficient |
|---|---|
| Blackjack | .5 |
| Casino War | .7 |
| Crazy 8 slot | 1 |
| Tiger slot | 1.5 |

Note that a player who wagers $100 (or 100) of credits on the blackjack game would earn 50 in total wager action, while a player who places $100 (or 100) of credits on Tiger slots would earn 150 in total wager action for the wager. Thus, the player would earn more total wager action (and hence more loyalty points when the player advances a level) by playing Tiger slots vs. blackjack. However, this can be rationalized by the fact that the Tiger slot game may have a lower player return than the blackjack game (for a player playing optimal strategy) and thus player's would lose their credits more quickly playing the Tiger slot game vs. playing blackjack and thus players could be compensated by earning more total wager action playing the Tiger slot game vs. playing blackjack (or the other games). The player is free to choose from a selection of games (such as those listed in Table II and others) which are all part of the game system.

From operation 601, the method proceeds to operation 602, which determines if the total wager action is greater than (or greater than equal) to the total wager action level threshold to advance to the next level (see Table I, column two in the current level+1). If no, then the player has not yet reached the next level and the method returns to operation 600 wherein the player can continue playing.

If in operation 602, it is determined that the total wager action is greater than (or greater than equal to) the total wager action level threshold to advance to the next level, then the method proceeds to operation 603, which advances the player's level. The player would typically be presented with a message congratulating the player for advancing to the next level.

From operation 603, the method proceeds to operation 604, which awards the player a respective amount of free loyalty points for advancing to the next level (see column 3 in Table I using the row for the new level). The method can then return to operation 600 wherein the player can continue playing as long as the player wants to (e.g., 1-10 more games or more).

Figure 7:
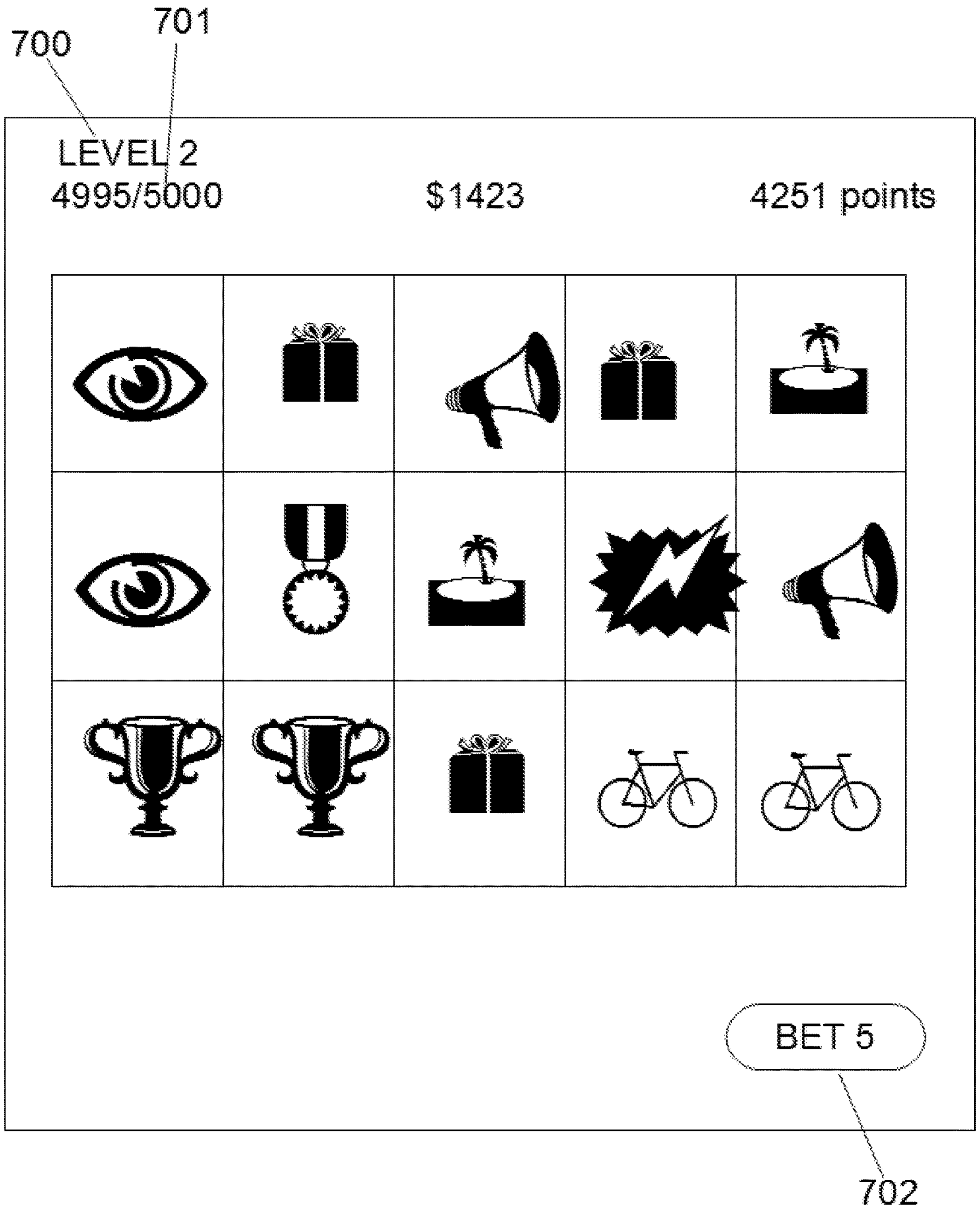
FIG. 7 is a drawing of a game output before a particular spin, according to an embodiment.

FIG. 7 is a drawing of a game output before a particular spin, according to an embodiment.

A level indicator 700 shows the player's current level (in this example the player is currently at level 2). A total wager action indicator 701 shows the player's total wager action (995) and the next total wager action level threshold (1000) which would trigger the player to advance to the next level (level 6).

Figure 8:
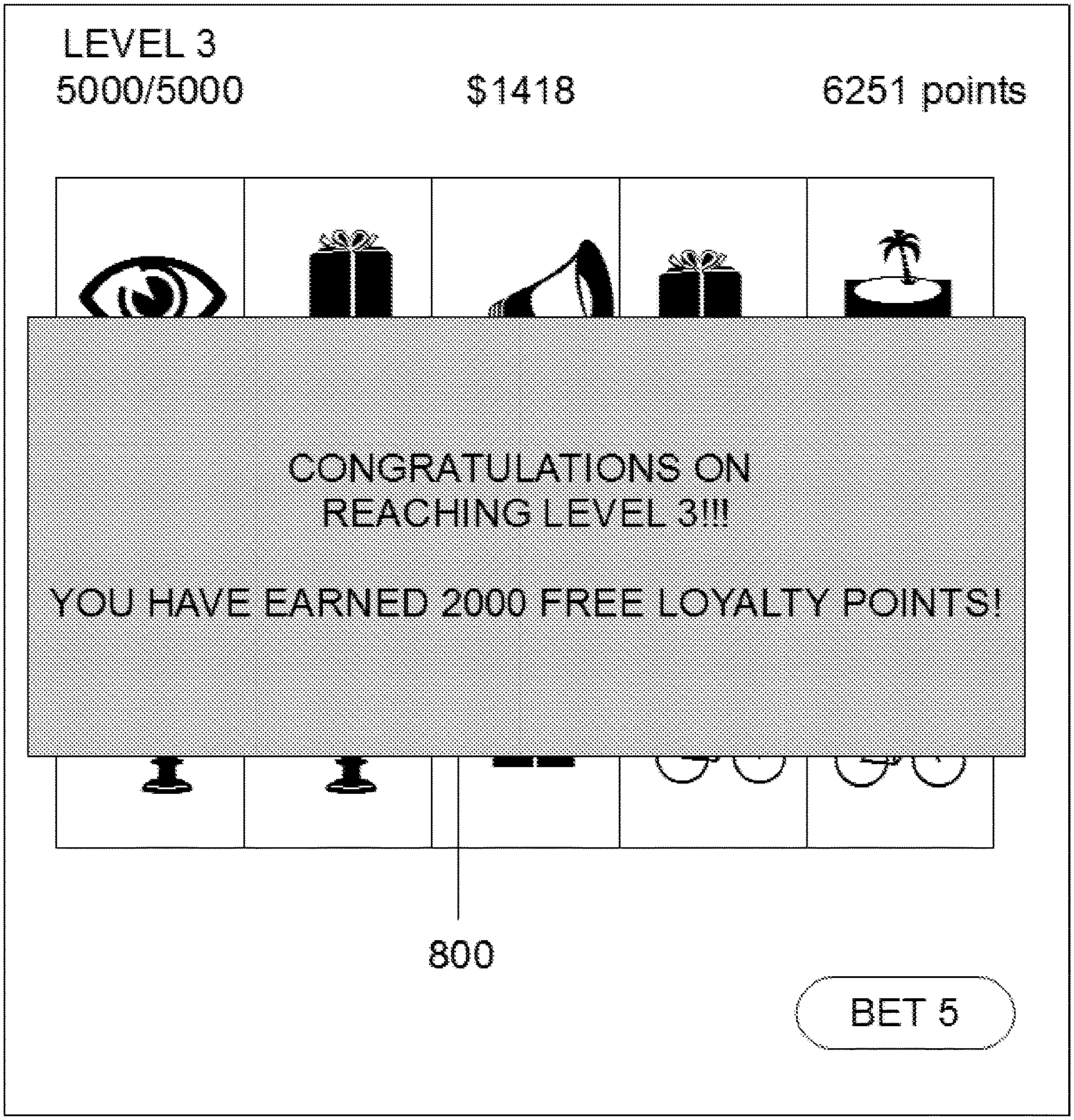
FIG. 8 is a drawing of a game output notifying a level advancement, according to an embodiment.

When the player presses the spin button 702, the player wagers 5 credits and then FIG. 8 is the result.

FIG. 8 is a drawing of a game output notifying a level advancement, according to an embodiment.

The total wager action is increased by the wager amount (5) and is now 5000 which triggers an increase to level 3 (see Table I and operation 603). A level up indicator 800 is displayed informing the player that he/she has reached a higher level (the level is typically increased by one) and also displays the current loyalty points earned for "leveling up." After FIG. 8 is displayed, then after a delay (e.g., 10 seconds and/or an acknowledgement from the player) the game proceeds to FIG. 9.

Figure 9:
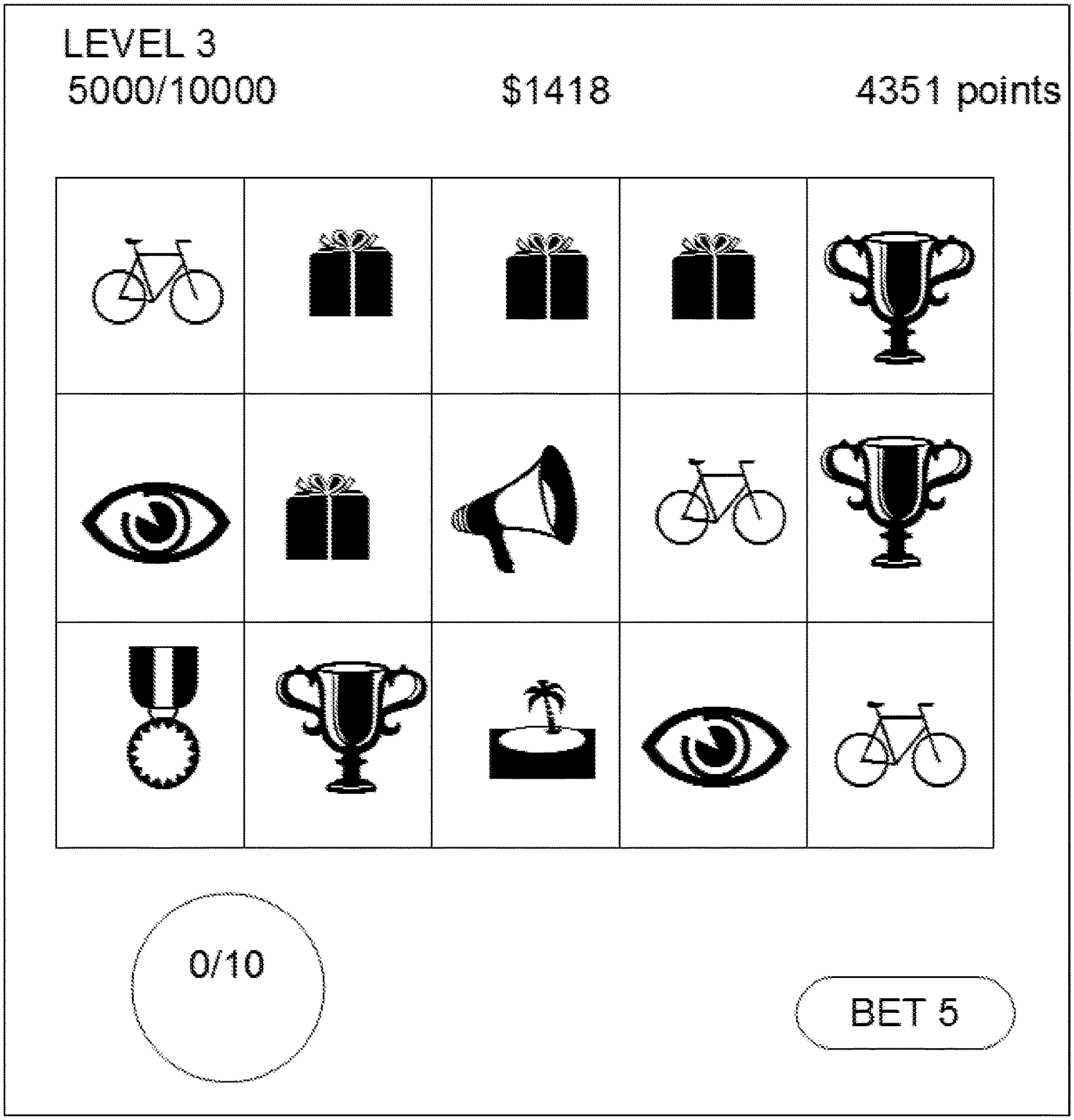
FIG. 9 is a drawing of a game after the particular spin, according to an embodiment.

FIG. 9 is a drawing of a game after the particular spin, according to an embodiment. The player is now playing at level 3. Each level may have different symbols, game features, awards, available wager amounts, etc.

Note that the loyalty points are awarded without regard to the actual outcome of the games. For example, if the player wins a large jackpot on a slot game or no payout at all will not matter as far as the computation of the loyalty point awards goes. Thus, loyalty points are independent of the outcome of the games.

Figure 10:
FIG. 10 is a drawing of a game output showing potential rewards, according to an embodiment.

FIG. 10 is a drawing of a game output showing potential rewards, according to an embodiment.

The player can navigate to a reward screen 1000 which displays a list of rewards. Each reward can have a venue (e.g., hotel name and location at hotel) where the reward can be redeemed. Each reward also has a respective cost in loyalty points which, when selected, will be deducted from the player loyalty points (this player has 4351 loyalty points as illustrated in FIG. 10). Of course, if a reward costs more in loyalty points than the player currently has, the player would not be allowed to select that reward. Once a reward is selected (the player can use his/her mouse to control pointer 1001 to select and click a reward), the player can confirm the purchase upon which the reward's respective amount of loyalty points will be deducted from the player's total amount of loyalty points and the player will be presented with instructions on how to actually redeem the reward.

Note that rewards can be offered by the same hotel group. For example, a particular group (or chain) of hotels/properties can all offer rewards as part of the system. The individual hotels may or may not receive compensation for offering these rewards on the game.

Figure 11:
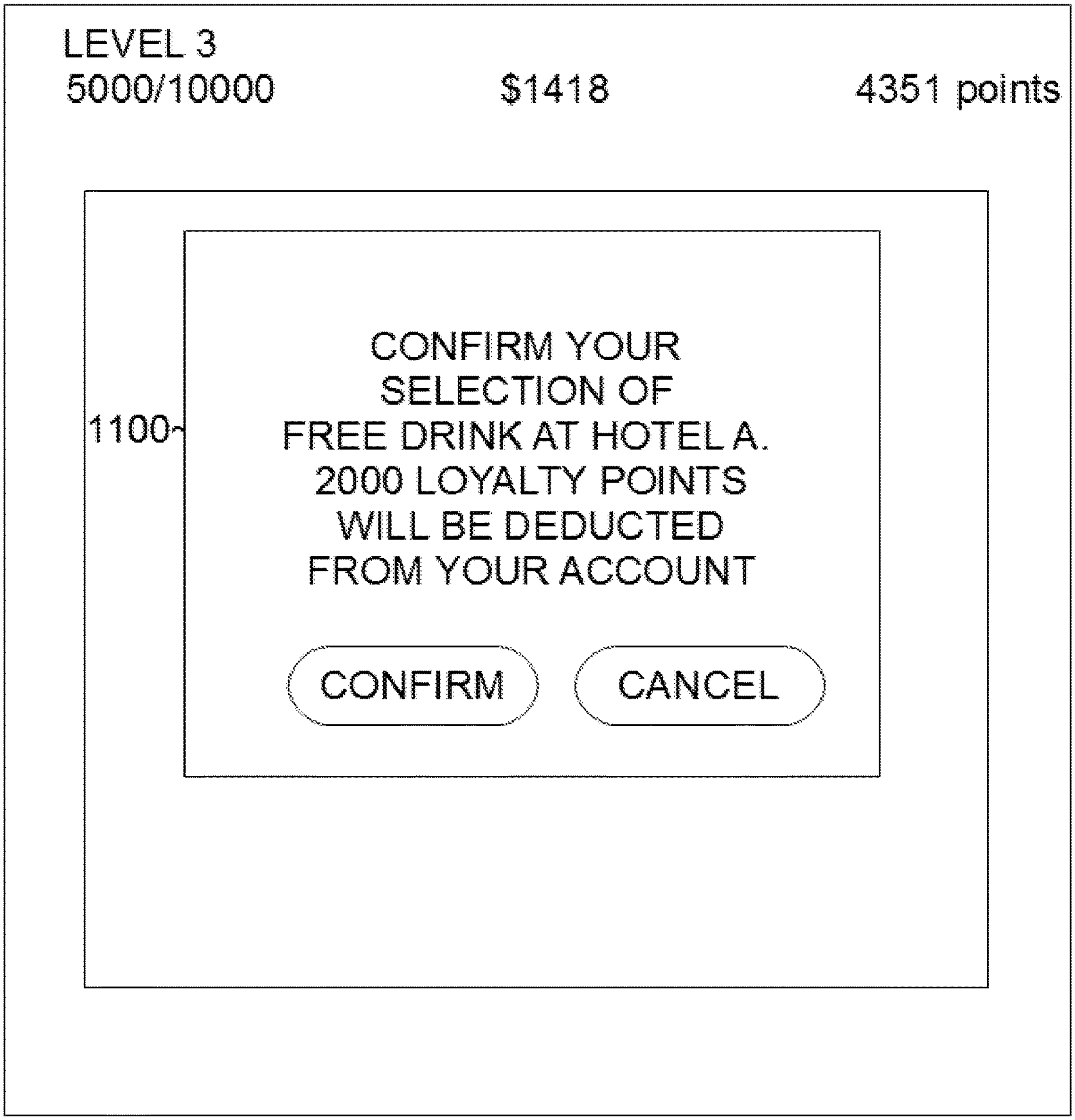
FIG. 11 is a drawing of a game output showing a reward confirmation screen, according to an embodiment.

FIG. 11 is a drawing of a game output showing a reward confirmation screen, according to an embodiment.

After a player clicks a particular reward on the reward screen 1000, the player is presented with a reward confirmation screen 1100 which allows the player to confirm the current transaction (the player will exchange a particular amount of loyalty points for the selected reward). The player can press (e.g., click using their mouse or other pointing device, touch using a touch-screen, etc.) the confirm button to complete the transaction or the cancel button to go back to the reward screen 1000. Once the player clicks confirm, then the reward issuance screen in FIG. 12 is displayed.

Figure 12:
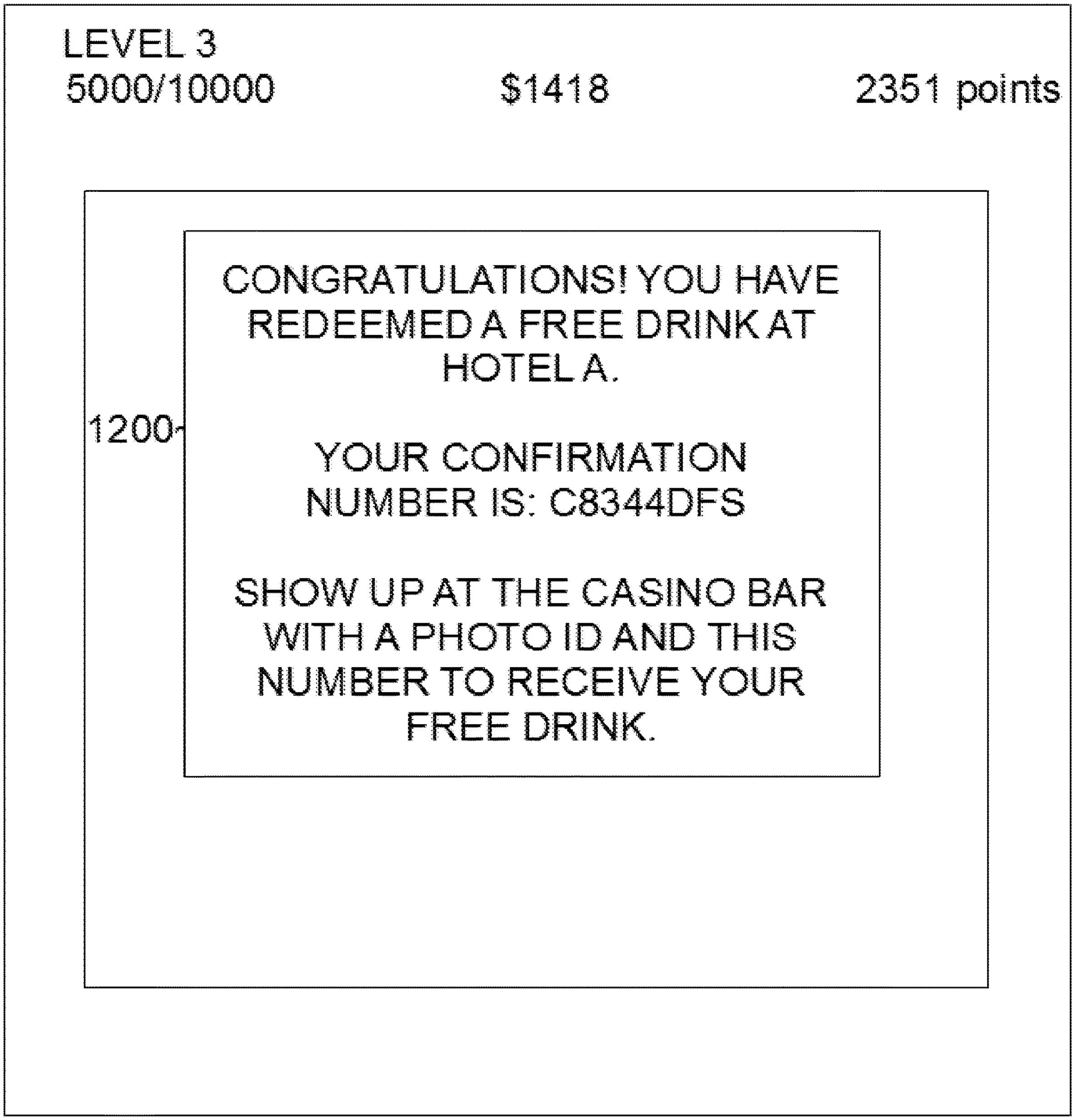
FIG. 12 is a drawing of a game output showing a reward issuance screen, according to an embodiment.

FIG. 12 is a drawing of a game output showing a reward issuance screen, according to an embodiment.

Reward issuance screen 1200 completes the transaction and provides the player with instructions on how to redeem their reward. The player can present a unique identification number (that locates a reward record in a database) to a casino (or other) personnel to retrieve the record in the database, confirm the player has won the reward (which may include checking the player's identification), and providing the actual reward to the player. The player may also be able to redeem their award online by providing a shipping address so the reward (if it is a tangible item) can be shipped to.

Figure 13:
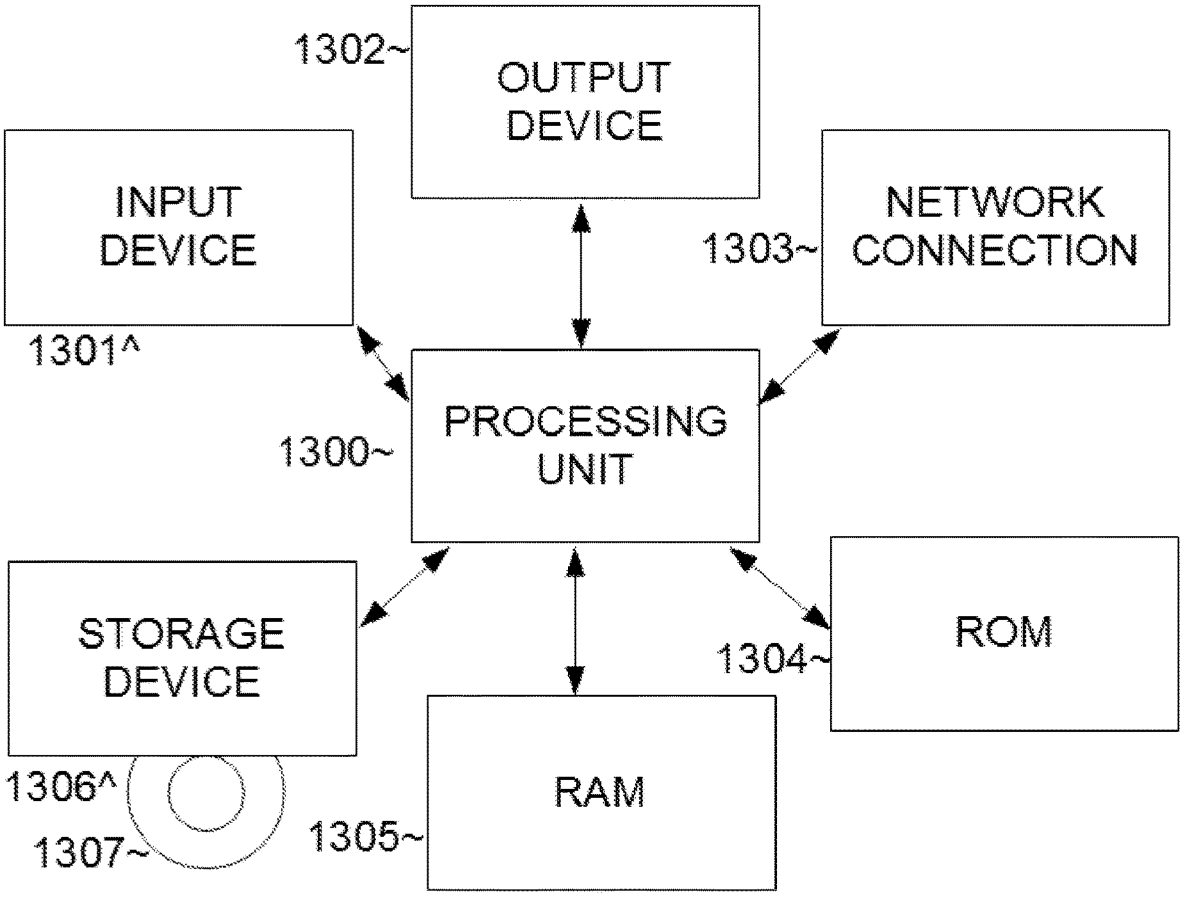
FIG. 13 is a block diagram illustrating exemplary hardware that can be used to implement the game described herein, according to an embodiment.

FIG. 13 is a block diagram illustrating exemplary hardware that can be used to implement the game described herein, according to an embodiment.

The hardware in FIG. 13 can be used to implement a computer implementing any method/feature described herein and/or a server that is serving the game to a computer which is displaying the game to a player. Such a server can interface with a social networking site (e.g., FACEBOOK, MYSPACE, etc.) that is used to coordinate the entire game and communicate with the players as well as a server used by the social network site.

A processing unit 1300 can be a microprocessor and associated structure (e.g., bus, cache, clock, etc.) which can be connected to an input device (e.g., touch-screen, keyboard, mouse, buttons, etc.), and an output device (e.g., touch-screen, CRT, monitor, etc.) The processing unit executes computer readable instructions which can implement any of the methods/features described herein. The processing unit 1300 can also be connected to a network connection 1303 which can connect to a computer communications network such as the Internet, Wi-Fi, LAN, WAN, etc. The processing unit 1300 can also be connected to a ROM 1304 and a RAM 1305 as used in the art. The processing unit 1300 can also be connected to a storage device 1306 which can be nonvolatile storage device (e.g., BLU-RAY drive, CD-ROM drive, hard drive, EPROM, etc.) A computer readable medium 1307 (e.g., BLU-RAY disc, CD-ROM, hard disc, etc.) can be read by the storage device 1306 and can store programs and assets that can cause the processing unit 1300 to perform any of the methods described herein. The ROM and RAM can also be loaded with instructions that can cause the processing unit 1300 to perform any of the methods described herein.

Figure 14:
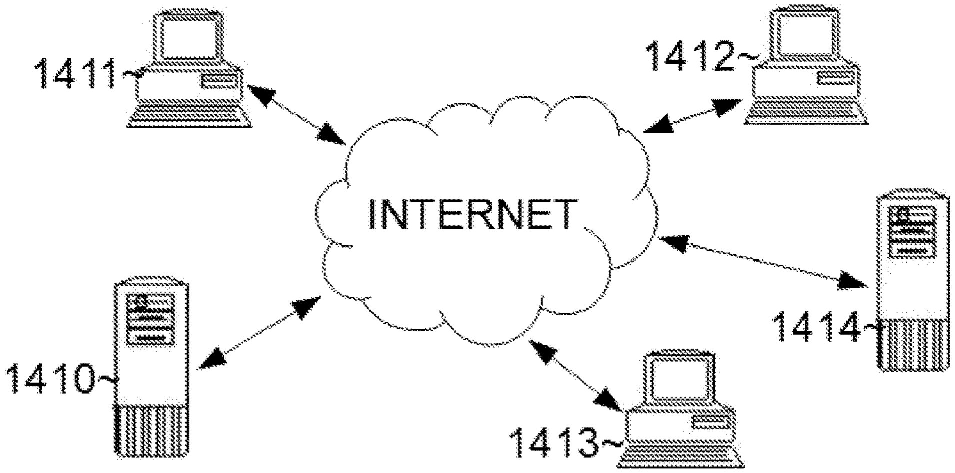
FIG. 14 is a network diagram showing a network structure for a social networking web site and players, according to an embodiment.

FIG. 14 is a network diagram showing a network structure for a social networking web site and players, according to an embodiment.

A computer communications network (such as the Internet) can be used to connect a host server 1410 which can host and serve a social networking site. Note that while FIG. 14 shows only one server as the host server 1410, the host server 1410 can encompass numerous servers all cooperating with each other (whether in the same physical location or not). The host server 1410 communicates with players 1411, 1412, 1413 through the Internet (or other computer communication network) and can implement any of the methods herein by executing computer code programmed accordingly. Game server 1414 can also implement all games and methods described herein on the site by executing computer code programmed accordingly. The game server 1414 is connected to the Internet and can communicate with all of the players 1411, 1412, 1413 directly or indirectly through the social networking site hosted by the host server 1410. The game server 1414 can cooperate with the host server 1410 so that the games run on the game server 1414 can be integrated into the social networking site hosted by the host server 1410. The game server can also be optional and all of the games can be also hosted on the host server 1410, whereby the integration of the games served/hosted by the game server 1414 will appear embedded in the social networking site hosted by the host server 1410 such that players would typically not realize (or care) that multiple servers are cooperating in order to play games on the social networking site. All of the communications described herein can be effectuated using such a network configuration. Typically, the communications are effectuated on the social networking site itself, thus the players 1411, 1412, 1413 should be logged into the social networking site in order to participate herein, although logging in is not required (e.g., communications can be transmitted using other methods, such as email, IRC chat, instant message, etc.) The host server 1410 can communicate with any of the devices illustrated in FIG. 1.

The player is permitted to purchase credits using real money using any server described herein (or other) in which the player can make an electronic payment (e.g., bank account, credit card, PAYPAL, etc.) to the server in exchange for a respective amount of credits (also referred to as chips, non-cash value chips, etc.) which are deposited into the player's account.

All components herein can be distributed across different such components as needed. For example, a single server as mentioned herein can be distributed across numerous different servers and locations. A processor (or processing unit) can also be distributed across multiple processors in a same or different computer (at a same or different location). The electronic components described herein represent an abstraction but it can be appreciated that the computer systems implementing the methods herein can be more numerous and interconnected than illustrated herein.

If a player is playing the game described herein on a social networking site or other type of hosted environment, then the player's computer would cooperate with the social networking server in order to present the game to the player. The player's computer would perform the instructions necessary to display the game while the remote server can determine the results (e.g., the final arrangement) and communicate this result via the Internet to the player's computer so that the player's computer can accurately display the result. The remote server may track and account for all credits wagered and won/lost while the player's computer can display the amount of credits owned or won at the direction of the remote server so the player cannot tamper with these amounts. All games described herein are considered to be played on the site described herein.

Any description of a component or embodiment herein also includes hardware, software, and configurations which already exist in the prior art and may be necessary to the operation of such component(s) or embodiment(s).

Further, the operations described herein can be performed in any sensible order. Any operations not required for proper operation can be optional. Further, all methods described herein can also be stored on a computer readable storage to control a computer. All features described herein (including all documents incorporated by reference) can be combined with one another without limitation. While the "credits" are used herein to refer to awards provided to players typically refers to non-cash value credits, this can also refer to cash credits as well (that are purchased by the player with cash and are directly redeemable for cash).

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method to implement a game, the method comprising:

executing on an electronic processing unit, instructions to perform:

a) enabling a player to select and play a wagering game out of a plurality of available wagering games for a wager amount of credits, wherein an outcome of the wagering game results in a random outcome which potentially awards additional credits to the player, wherein the credits are not exchangeable for cash, b) increasing a total wager action by a value based on the wager amount of credits;

c) when the total wager action reaches a level threshold, awarding an amount of loyalty points to the player and incrementing a level of the player and resetting the total wager action to zero; and enabling the player to repeat operations a, b and c; and offering the player an option to exchange the loyalty points for tangible goods and/or services, wherein the value is determined based upon the wagering game and the wager amount, wherein each wagering game in the plurality of wagering games is associated with a characteristic used to determine the value.

2. The method as recited in claim 1, wherein in operation c, the amount of loyalty points awarded varies based on the level.

3. An apparatus to implement a game, the apparatus comprising:

an electronic input device;

an electronic output device;

an electronic processor connected to the electronic input device and the electronic output device, the electronic processor configured to read and execute computer readable instructions from a non-transitory storage medium, the computer readable instructions programmed to cause the electronic processor to perform:

a) enable a player to select and play a wagering game out of a plurality of available games for a wager amount of credits, wherein an outcome of the wagering game results in a random outcome which potentially awards additional credits to the player, wherein the credits are not exchangeable for cash;

b) increase a total wager action by a value based on the wager amount of credits;

c) when the total wager action reaches a level threshold, award an amount of loyalty points to the player and incrementing a level of the player and resetting the total wager action to zero; and enable the player to repeat operations a, b and c; and offer the player an option to exchange the loyalty points for tangible goods and/or services, the value is determined based upon the wagering game and the wager amount, wherein each wagering game in the plurality of wagering games is associated with a characteristic used to determine the value.

4. The apparatus as recited in claim 3, wherein the computer readable instructions are further configured such that in operation c, the amount of loyalty points awarded varies based on the level.

* * * * *